United States Patent
Schulz et al.

(10) Patent No.: US 6,303,679 B2
(45) Date of Patent: Oct. 16, 2001

(54) NOBLE METAL PREPARATION AND ITS USE TO PRODUCE NOBLE METAL DECORATIONS BY DIRECT AND INDIRECT PRINTING

(75) Inventors: Andreas Schulz, Offenbach; Elisabeth Zimmerbeutel, Rodenbach; Susanne Keyn, Frankfurt, all of (DE); Stephen J. Hackett, Staffordshire (GB)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/824,239

(22) Filed: Apr. 3, 2001

Related U.S. Application Data

(62) Division of application No. 09/350,121, filed on Jul. 9, 1999.

(30) Foreign Application Priority Data

Jul. 11, 1998 (DE) .............................. 198 31 141

(51) Int. Cl.⁷ ...................................................... C08K 3/00
(52) U.S. Cl. ............................................................ 524/398
(58) Field of Search ........................... 524/398; 428/195, 428/209

(56) References Cited

U.S. PATENT DOCUMENTS 3,092,504    6/1963    Langley et al. .
3,163,665    12/1964   Fitch .

FOREIGN PATENT DOCUMENTS

| 1 232 168 | 7/1963 | (DE) . |
| 1 421 865 | 1/1969 | (DE) . |
| 3122 546 | 12/1982 | (DE) . |
| 36 16 547 | 9/1987 | (DE) . |
| 0 440 877 | 8/1991 | (EP) . |

*Primary Examiner*—Edward J. Cain
(74) *Attorney, Agent, or Firm*—Wenderoth, Lind & Ponack, L.L.P.

(57) ABSTRACT

The invention relates to a noble metal preparation for producing noble metal decorations on decoratively fireable substrates by direct printing and indirect printing (transfer technique). The printing quality of the preparation containing noble metal compounds and a binder system can be improved in that the binder system comprises a resin mixture of a) 25 to 40 wt. % of polyamide resins, b) 5 to 30 wt. % of sulfurised recent resins, c) 20 to 55 wt. % of rosin-modified resins, d) 0 to 30 wt. % of alkylphenol resins and e) 0 to 30 wt. % of other resins compatible therewith or of the reaction products, formed at 50 to 150° C., of the resin mixture mentioned and/or the reaction products, formed at 50 to 150° C., of the resin mixture mentioned or the reaction products of same containing the noble metal compounds in the presence of a sulfur-containing gelling agent.

21 Claims, No Drawings

NOBLE METAL PREPARATION AND ITS USE TO PRODUCE NOBLE METAL DECORATIONS BY DIRECT AND INDIRECT PRINTING

This application is a divisional of Ser. No. 09/350,121 filed Jul. 9, 1999.

BACKGROUND OF THE INVENTION

1. Field of the Invention

The invention relates to new noble metal preparations for producing noble metal decorations on decoratively fireable substrates such as glass, ceramic, bone china and porcelain, and a process for their preparation. The preparations are suitable. for direct printing and indirect printing, which is why the invention relates to both use of the noble metal preparation and to a transfer containing such a noble metal preparation.

2. Description of Related Art

Various noble metal preparations, in particular gold preparations, which can be applied to decoratively fireable substrates using direct or indirect printing, that is using a transfer technique, are already known and lead to a bright or burnishable noble metal decoration in the decoration firing process. Preparations which lead to bright decorations are called bright gold preparations. Bright gold preparations contain one or more organic noble metal compounds which are substantially soluble in an organic medium. Typical noble metal compounds for bright gold preparations are so-called resinates, in particular however sulforesinates, that is thiolates of terpenethiols, and synthetic noble metal thiolates of various other organic mercapto compounds. So-called burnished noble metal preparations, in particular burnished gold preparations, contain the noble metal in the form of compounds which are soluble and/or insoluble in the medium such as, for example, gold sulfide and many elemental noble metals in powder form. These preparations usually also contain one or more soluble fluxes, in particular organic compounds, such as resinates, carboxylates and alcoholates, in particular of elements from the group comprising Rh, Bi, Cr, V, Ni, Co, Fe, Sn, Zr, Ta, Si, B and Al, which have an effect on the structure of the noble metal film and its adhesion to the substrate. A medium which is also suitable for use in preparations for transfers substantially consists of one or more binders which are mutually compatible and solvents for the resins and noble metal compounds, or it may be largely solvent-free and substantially consist of thermoplastic resins which are liquid at the application temperature and optionally wax-like compounds. Reference is made, by way of example, to U.S. Pat. Nos. 3,092,504 and 3,163,665, DE-AS 14 21 865 and EP-B 0 440 877.

In the case of transfers required for indirect printing, an image layer consisting of the noble metal preparation or containing this is applied directly to a support, in particular paper provided with a water-soluble size layer or a wax layer or onto a base layer and this layer is overfilmed directly or after applying an intermediate layer containing a glass flux. Reference is made, by way of example, to DE-AS 12 32 168, DE 36 16 547 C1 and DE 31 22 546 C2.

Although the binders contained in the medium in noble metal preparations burn away during the firing process, they have a considerable effect on the quality of the decoration. It has been shown that dark decorations, decorations with streaks in the gloss and/or insufficient burn-out and with inadequate adhesion may often be produced, depending on the binder system used. Another reason for defects in decorations may comprise soluble noble metal compounds being dissolved out of the image layer during the overfilming process, which leads to reduced brilliance, red fringes and to the production of streaks and/or poorly defined decorations. In the case of transfers, decoration defects result from tears.

To solve or reduce the problems mentioned above, various processes have been suggested. According to DE-AS 12 32 168, an impermeable protective layer for the covering layer, made of an oxidisable or polymerisable, alkyd, phenol, urea or epoxy resin material or a material containing dry oil, is placed between the image layer and the covering layer. The additional layer reduces fringes round the decoration but increases the cost.

The image layer in the transfer according to DE-PS 36 16 547 is based on a bright noble metal preparation which contains 8 to 30 wt. % of a thermoplastic resin. A resin from the group comprising asphalt resin, polyamide resin, maleate resin, phenol resin, ketone resin and epoxide resin is used as the thermoplastic resin. The use of only one type of resin leads to qualitatively unsatisfactory images in one way or another. Whereas, as has been demonstrated by the inventor of the present application, although a thermoplastic polyamide resin leads to satisfactory flexibility and extensibility and thus to no tears in the transfer, sufficient compatibility with the organic noble metal compounds and flux compounds is not ensured, with the result that decoration defects, in particular insufficient gloss, and/or problems during application, such as in particular inadequate flow, occur. Although maleate resins often lead to bright decorations, these are often also aesthetically too dark; phenol resins often lead to insufficient burn-out and thus to insufficient gloss and/or inadequate adhesion. The document mentioned above does not disclose any binder mixtures for overcoming the problems.

DE-AS 14 21 865 also discloses using media with more than one binder, for example a mixture of a rosin and asphalt resin, in noble metal preparations. A combination of this type, however, leads to decoration defects with transfers, including tears.

A commercially available bright gold preparation for indirect printing on glass and bone china is the product GGP 1230 from the Heraeus Co. Although this product enables the production of tear-free and bright decorations, the dishwasher resistance, that is the adhesion to glass, is regarded as unsatisfactory. Visible damage to the decorations occurs after only 20 wash processes in an automatic dishwasher for glassware. Smooth gold films are not produced on bone china with GGP 1230. The adhesion of decorations to various substrates depends both on the flux system and on the binder system. The composition of the binder system in this preparation cannot be determined in detail from chemical analysis, but amide groups make the presence of a polyamide probable. Another preparation, GGP 1215/Heraeus, contains amide groups and structural elements of rosin; this resin is suitable for porcelain and earthenware, but not for glass.

SUMMARY OF THE INVENTION

The object of this invention is to provide further noble metal preparations, in particular bright gold preparations, which are suitable for producing transfers and also lead to high-quality, in particular pale, bright, tear-free and efficiently burn-outable decorations on glass with improved dishwasher resistance.

A noble metal preparation which is directed at the requirements of suitability for high-quality transfers has been found, wherein the core factor is the binder system according to the invention. Therefore, the invention provides a noble metal preparation for producing noble metal decorations on decoratively fireable substrates, containing one or more noble metal compounds of Au, Ag, Pd or Pt, a medium, the binder system in which contains a polyamide resin and a rosin resin, and one or more fluxes, characterised by a binder system consisting of a resin mixture of a) 25 to 40 wt. % of one or more polyamide resins, b) 5 to 30 wt. % of one or more sulfurised recent resins, in particular sulfurised dammar resin, c) 20 to 55 wt. % of one or more rosin-modified resins, d) 0 to 30 wt. % of one or more alkylphenol resins and e) 0 to 30 wt. % of other resins, apart from non-plasticising resols, or of the reaction products, formed at 50 to 150° C., of the resin mixture mentioned and/or of the reaction products, formed at 50 to 150° C., of the resin mixture mentioned or the reaction products of same containing the noble metal compounds in the presence of a sulfur-containing gelling agent.

The sub-claims relate to preferred embodiments of the noble metal preparation. According to one preferred embodiment, and this is particularly expedient for preparing silver-containing gold films, either at least two different rosin-modified resins in the ratio by weight of 10 to 1 to 1 to 10 or at least one rosin-modified resin and an alkylphenol resin in the ratio by weight of 10 to 1 to 1 to 1, in addition to the sulfurised recent resin and the polyamide resin, are used as binders.

According to another preferred embodiment, the binder system consists of a resin mixture, 27 to 55 wt. % of one or more rosin-modified resins, 7 to 20 wt. % of sulfurised dammar resin, 27 to 37 wt. % of polyamide resin and 0 to 30 wt. % of alkylphenol resin, wherein in binder systems which contain two rosin-modified resins these resins are present in a ratio by weight of 5 to 1 to 1 to 5 and in a binder system which contains a rosin-modified resin and an alkylphenol resin these resins are present in the ratio by weight of 4 to 1 to 1 to 1, and/or of reaction products of the resin mixture mentioned formed in the presence or absence of a sulfur-containing gelling agent.

The invention also provides a transfer, the decoration-forming layer in which has been produced by using the noble metal preparation according to the invention. The noble metal preparation can be applied to a decoratively fireable substrate such as glass, ceramic, porcelain, bone china and other siliceous materials by a conventional direct printing process or by indirect printing, that is using the transfer containing the preparation in the image layer, and fired thereon under conventional conditions, wherein high-quality decorations are obtained.

DETAILED DESCRIPTION OF THE PREFERRED EMBODIMENTS

The noble metal preparations according to the invention may be bright noble metal or burnished noble metal preparations. Bright preparations, in particular bright gold preparations which contain compounds of silver and/or platinum or palladium to modify the colour, in addition to one or more gold compounds, are preferred. Bright gold metal preparations conventionally contain 6 to 15 wt. % of noble metal in the form of organic, in particular sulfur-containing, compounds which are soluble in the medium, such as sulforesinates and other thiolates. Burnished gold preparations contain, as an alternative to or in addition to soluble organic gold compounds, insoluble inorganic noble metal compounds and/or elemental noble metal; the gold content of this type of burnished preparation is generally in the range 15 to 40 wt. %.

The medium for preparations according to the invention may contain a solvent or be solvent-free. In the first case, the binder is generally 15 to 25 wt. %, in the second case mostly 20 to 45 wt. % of the mixture. The viscosity of the preparations can be adjusted, apart from via the combination of resins, by the amount and type of one or more solvents and/or by thermal treatment of the binder combination and/or by gelling the medium containing the noble metal compounds in the presence of a sulfur-containing gelling agent at elevated temperature. To prepare screen-printing pastes, the mixture of individual binders or a thermally pre-treated mixture of the same is gelled in the presence of the decoration-forming noble metal compounds and a sulfur-containing gelling agent. Here, gelling is understood to mean a cross-linking process, but one which still enables screen-printing.

The binder system according to the invention contains at least three, but preferably four, resins from the classes mentioned above in amounts in accordance with the claims. Only the combination makes it possible to obtain a preparation with high decorative quality which is suitable for transfers. The polyamide resin(s) contribute substantially to the elasticity and flexibility and thus to freedom from tears in the decorative layer in transfers. The disadvantages of polyamide resins are alleviated by the other resins. Here, the sulfurised natural resin has a surprisingly large effect on the production of a bright finish. Whereas a combination of one each of the resins (a), (b) and (c) leads to acceptable decorative results with silver-free gold decorations, there is a risk of dark and/or insufficiently burnt-out decorations with silver-containing gold decorations. Surprisingly, it is possible to overcome the problems mentioned by using a combination of two different rosin resins (c) or one rosin resin combined with an alkylphenol resin (d). The binder system expediently contains the two resins in the ratios by weight mentioned above.

Apart from the resin combination mentioned, the binder system may also consist of the resins mentioned and in the amounts mentioned in the form of reaction products produced during production of the preparation at 50 to 150° C., in particular 80 to 140° C. These types of reaction products may be produced in particular when using reactive alkylphenol resins.

In accordance with the alternative preferred for screen printable noble metal preparations, the binder system consists of reaction products such as the ones which may be formed from the previously mentioned resin combination in the presence of a sulfur-containing gelling agent and the noble metal compounds at 50 to 150° C. The gelling agents may be agents which are known from rubber vulcanisation. Examples are sulfur, polysulfides, organic disulfides and oligosulfides, sulfenamides and dithiocarbaminates, dithio-4,4'-dimorpholine being particularly preferred. The amount of sulfurising agent used is generally in the range 0.1 to 3 wt. %. During the gelling process, expediently performed in the presence of a solvent, the viscosity of the preparation increases. Sulfur bridges are probably formed between constituents in the sulfur-containing binder system and/or with the sulfur-containing noble metal compounds. The viscosity characteristics required are produced by gelling; in addition the storage stability of the preparation and the firing-on characteristics are improved.

Alkylphenol resins are understood to be those alkylphenol/formaldehyde resins in which the para-position, optionally also the meta-position, in the phenol is/are alkyl-substituted, in particular with a tert.-butyl, diisobutyl or phenyl group, so that these resins do not cross-link, or cross-link to only a small extent. The resins have a softening point in the range of 40 to 120° C. and are soluble in or can be diluted with aliphatic hydrocarbons. Resins such as those described in Kittel, "Lehrbuch der Lacke und Beschichtungen" (1961), vol. I.1, pages 341–346 are suitable.

Suitable polyamide resins are those which are used as lacquer resins and hot-melt adhesives. The softening point of the polyamide resins is preferably in the range 50 to 150° C., in particular in the range 80 to 120° C. They are generally aliphatic polyamides with structural elements from a dicarboxylic acid and/or a diamine with more than 8 carbon atoms; the dicarboxylic acid components in the polyamides are preferably dimeric fatty acids.

Sulfurised recent resins are sulfurised resins from living trees. Some of these natural resins have terpenoid structures. Sulfurised resins based on sesquiterpenes, diterpenes and in particular triterpenes are preferred. When sulfurising terpene resins, quite considerable a:.ounts of sulfur are taken up by these in the form of thioether bridges, disulfide and oligosulfide bonds and thiol groups. Sulfurised resins to be used according to the invention preferably contain 5 to 20 wt. % of sulfur. Sulfurised dammar resin with a sulfur content of 5 to 20 wt. %, preferably 8 to 12 wt. %, are particularly preferred.

Suitable rosin-modified resins are those which are used as lacquer resins. These types of resins have a softening point in the range 50 to 160° C., in particular 80 to 140° C. They are, for example, glycerol esters of rosin or esters of primary dihydric to hexahydric alcohols, such as pentaerythritol, trimethylolpropene, trimethylolethane, dipentaerythritol and neopentyl glycol with rosin, glycerol esters and pentaerythritol esters of maleic acid-modified rosin and rosin-modified phenol resins. Examples of these kinds of resins and their alcohol components, acid values, colour and solubility can be obtained from any current lacquer tables (for example, Karsten, Lackrohstofftabellen (1987) 8th ed. Curt R. Vincentz Verlag, Hannover).

When choosing the resin constituents in the context of this invention, a person skilled in the art may ensure that the components are compatible with each other and are soluble in the chosen solvent system by means of orienting preliminary tests. This test procedure is required in particular when additional different resin(s) are also used in these preparations. Whereas in the case of some optionally present other resins, for example asphalt resins, the burn-out characteristics are not affected, non-plasticising resols have proven to be unsuitable.

Solvent-containing preparations generally contain 10 to 40 wt. % of one or more solvents. Suitable solvents are aliphatic, cycloaliphatic, aromatic hydrocarbons, in particular alkylated aromatic compounds and terpenoid hydrocarbons, ketones, alcohols and ethers. The boiling point of the solvent is expediently above 110° C., in particular in the range from about 140 to 230° C. The preparation preferably contains more than one solvent, for instance a mixture of an alkyl aromatic compound, an alkylcycloaliphatic compound, a carbocyclic ketone and an alcohol.

Solvent-free or at least low-solvent (less than 10 wt. %) preparations expediently contain wax-like compounds to adjust to optimum printing properties, for example as a solution promoter, adjusting the softening point and viscosity/temperature behaviour. Suitable substances are polyolefin waxes, fatty alcohols, fatty amides and polyalkylene glycols. Preparations according to the invention may also contain conventional plasticisers such as dibutyl phthalate.

Preparing the preparations comprises mixing and homogenising the binder. The individual resins are expediently placed in contact with each other in sequence at 50 to 150° C., with stirring, wherein in the case of a solvent-containing system solvents may be present. According to a preferred embodiment, a sulfurised recent resin, for example sulfurised dammar resin, and one or more rosin-modified resins are stirred in an alkylaromatic solvent at 80 to 140° C. until the mixture is homogeneous, then, if present, the alkyl phenol resin is added and the mixture is again homogenised and lastly the polyamide resin is introduced and homogenised at the temperature mentioned above. The noble metal compounds are introduced into the binder system. If desired, and this corresponds to a particularly preferred embodiment for screen printable pastes, the mixture is gelled at 50 to 150° C., preferably 80 to 140° C., with 0.1 to 3 wt. %, in particular 0.5 to 2 wt. %, of a sulfur-containing gelling agent. The amount of sulfurising agent used is governed by the processing viscosity required. More sulfurising agent is likely to be required for preparations with a low binder content. During this gelling stage, sulfurisable constituents of the binder and/or the noble metal thiolates are cross-linked via sulfide, disulfide or oligosulfide bridges. Sulfurisable binders are those which are unsaturated and/or are already partly sulfurised. The flux may be added before or after thermal treatment with a sulfurising agent. Preparations according to the invention generally contain a conventional amount of one or more fluxes known to a person skilled in the art. Organic compounds of Rh, Cr and Bi are conventionally present as fluxes, but often also other compounds such as Si, Al, Co, Ni, Sn, Ta or Ti compounds.

Preparations according to the invention may be used to produce transfers. These types of transfers comprise a support base with a conventional water-soluble or thermally softening separating layer, a decorative image layer consisting of the noble metal preparation according to the invention and a film-forming covering layer consisting of a conventional film-former, for example a methacrylate resin.

The transfer may also have a base layer located between the separating layer and the image layer and/or a top layer located between the image layer and the covering layer. The base layer may be a layer containing an oxide and/or a glass frit, which improves the adhesion and/or means that matt decorations can be produced (see e.g. DE-PS 31 22 546). The top layer is, for example, a layer containing a glass frit, which means that abrasion-resistant decorations can be produced (see e.g. DE-PS 36 16 547). The image layer is applied in a conventional way, preferably using screen printing.

Both the noble metal preparation according to the, invention and also the transfer containing this type of preparation can be used in a known way to produce noble metal decorations on decoratively fireable substrates. Conventional printing processes may be used for direct printing, such as screen printing and pad printing. Obviously, application of the preparation with brushes or using a banding machine is also possible. Substrates for direct and indirect printing are, for example, glass, ceramic, bone china and porcelain. The decoration applied to the support is fired in a known way under firing conditions appropriate to the substrate.

Use of the preparation according to the invention using a direct printing or indirect printing process leads to high-quality decorations. Bright preparations lead to pale, bright and tear-free decorations. The following examples explain the invention.

EXAMPLES

Preparing the Preparations (general method)

A 50 wt. % strength solution of sulfurised dammar resin in a mixture of pine oil and toluene with a sulfur concentration in the solution of 9.1% (=gD) and the rosin resin(s) from the group comprising glycerol esters of rosin (=$K_1$; softening point 90° C.), pentaerythritol esters of rosin (=$K_2$; softening range 113 to 123° C.) and glycerol esters of maleic acid-modified rosin (=$K_3$; softening point 142° C.) were homogenised at 125° C. in the presence of an alkylaromatic solvent. Then, if present, an alkylphenol resin with a melting range of 50 to 60° C. (=APH) and in examples 12 and 15 a non-plasticising resol with a melting range of 45 to 55° C. (=PH) were added and homogenised at 125° C. Finally, a polyamide resin based on a fatty acid dimer with a softening point of about 100° C. (=PA) was incorporated into the system at the same temperature. Reactive groups in the resins could react with each other at the chosen temperature. The noble metal compounds and flux and, if required, more solvent were added to the binder system.

Since preparation of the preparations in the examples given in the table included a gelling stage, this was performed before adding the flux by adding the gelling agent di-4,4'-morpholino disulfide to the binder systems containing the decoration-forming noble metal compounds, prepared as described above, and performing gelling at 110 to 120° C. over the course of 5 to 90 minutes. In examples 1 to 15, 1.07 g, in example 16 1.00 g, in example 17 0.79 g and in examples 18 to 21 1.04 g of di-4,4'-morpholino disulfide were used.

In the examples, the flux combinations A, B or C given in the table were used, these containing the following metals in the form of resinates (wt. %)

A: 0.03 Rh; 0.08 Bi; 0.03 Zr; 0.01 B; 0.008 Cr; 0.04 Co; 0.04 V; 0.02 Ta.

B: 0.03 Rh; 0.05 Si; 0.04 Cu; 0.02 B; 0.04 Bi; 0.03 Zr; 0.10 S; 0.06 V.

C: 0.06 Rh; 0.03 Si; 0.06 Ni.

Solvent-containing preparations also contained alkylaromatic compounds, cyclohexanone, benzyl alcohol and methyl cyclohexanol in the ratio of about 3:3:2:1, in addition to the pine oil in the sulfurised dammar. The printing viscosity of the pastes was in the range 2000 to 10,000 mPa·s. The solvent content of the thermoplastic preparation (=example 20) was less then 10%; but the preparation contained $C_{16}$-$C_{18}$ fatty alcohols in order to adjust the printing viscosity.

Examples 1–17, according to the invention or not according to the invention, were performed using a gold sulforesinate (50% Au); the gold content of the preparations was 9.8wt. % each time. The preparations in examples 1 to 16 also contained 5 wt. % of a silver mercaptide (20% Ag). Examples 17 to 19 contained only the gold sulforesinate as a decoration-forming noble metal compound (Au content 98%). The burnished gold preparation contained the sulforesinate in conventional amounts (=9.8% Au) and also elemental Au powder; total Au content 26%. Examples 1 to 15 also contained 3.3 wt. % of dibutyl phthalate, examples 1 to 11 also contained 3.3 wt. % of camphor.

For indirect printing, transfers were prepared and these applied in a conventional way. The printing paste was applied to metapaper using screen printing, dried and then overfilmed with a commercially available film solution (80450 from Cerdec AG). Direct printing (examples 10i and 11i and 20) was performed by screen printing. Direct printing of the thermoplastic preparation in example 20 was performed using a heated screen.

Firing conditions on glass: heating to 600° C. over 1 hour, 15 min waiting time, cooling to 25° C. over 1 hour.

Firing conditions on bone china (BC) (examples 17 to 19): 250° C./min, rate of heating to 780° C., 45 min waiting time, cooled. On porcelain (example 17): 400° C./h rate of heating, 10 min waiting time at 820° C.

Firing conditions for the burnished gold preparation (example 21), which contained a glass frit and a rhodium-containing high-temperature rapid firing flux: rate of heating 2400° C./h, waiting time 1 min.

Details relating to the binder systems, decoration-forming noble metals in the preparations and firing results during indirect printing and sometimes direct printing on glass, bone china and porcelain are given in the table. Unless stated otherwise, indirect printing was used.

| No. | gD | APH | PA | $K_1$ | $K_2$ | $K_3$ | Noble metal | Flux | Substrate | Decoration quality | Comments |
|---|---|---|---|---|---|---|---|---|---|---|---|
| 1/E | 3 | | 5 | | | 10 | Au/Ag | A | Glass | 0 | bright, but slightly dark |
| 2/E | 3 | 2.5 | 5 | | | 7.5 | Au/Ag | A | Glass | + | bright, paler than 1/B |
| 3/E | 3 | 5 | 5 | | | 5 | Au/Ag | A | Glass | ++ | bright, paler than 2/E |
| 4/CE | 3 | 7.5 | 5 | | | 2.5 | Au/Ag | A | Glass | − | moderately bright |
| 5/CE | 3 | 10 | 5 | | | 0 | Au/Ag | A | Glass | −− | slightly bright |
| 6/CE | 3 | 10 | 7.5 | | | | Au/Ag | A | Glass | − | pale, but distinct smears |
| 7/E | 3 | 2 | 7.5 | | | 8 | Au/Ag | A | Glass | ++ | pale and bright |
| 8/E | 3 | 4 | 7.5 | | | 6 | Au/Ag | A | Glass | ++ | pale and bright |
| 9/E | 3 | 6 | 7.5 | | | 4 | Au/Ag | A | Glass | 0 | pale, slight smears |
| 10/E | 3 | | 6.25 | | 2 | 8 | Au/Ag | A | Glass | (i) ++ (ii) ++ | bright and pale with direct (i) and indirect (ii) printing |
| 11/E | 3 | | 6.25 | 2 | | 8 | Au/Ag | A | Glass | (i) ++ (ii) ++ | bright and pale with direct and indirect prtinting |
| 12/CE | 3 | 2 PH 0 APH | 6.25 | | | 8 | Au/Ag | A | Glass | −− | incomplete burn-out |
| 13/E | 3 | 2 | 6.25 | | 8 | | Au/Ag | A | Glass | ++ | bright |

-continued

| No. | gD | APH | PA | K₁ | K₂ | K₃ | Noble metal | Flux | Substrate | Decoration quality | Comments |
|---|---|---|---|---|---|---|---|---|---|---|---|
| 14/E | 3 | 2 | 6.25 | 8 | | | Au/Ag | A | Glass | ++ | bright |
| 15/CE | 3 | 8 PH 2 APH | 6.25 | | | | Au/Ag | A | Glass | -- | incomplete burn-out |
| 16/E | 5 | 2 | 6.25 | | | 6.5 | Au/Ag | B | Glass | ++ | bright |
| 17/E | 5 | 2 | 5 | | | 6.5 | Au | C | BC | ++ | bright |
| | | | | | | | | | Porc. | ++ | bright |
| 18/E | 3.5 | | 5 | | 10 | | Au | C | BC | + | bright |
| 19/CE | | | 6 | | 14 | | Au | C | BC | -- | could not be printed |
| 20/E | 5 | 2 | 6 | | | 5 | Au/Ag | B | Glass | ++ | bright; direct printing |
| 21/E | 3.4 | 0.9 | 4.3 | | | 6 | Au | HTS | Porc. | ++ | silky bright after burnishing |

Decoration quality:
++ very good
+ good
0 acceptable
− mediocre
−− poor
BC: bone china
Porc. porcelain
E: according to the invention
CE: not according to the invention The test results show that preparations which contain binder systems in accordance with the claims enable the production of high-quality decorations.

What is claimed is:

1. A transfer for producing a noble metal decoration on decoratively fireable substrates, comprising:
    a support base, a decorative layer and a film-forming covering layer,
    wherein the decorative layer is produced using a noble metal preparation comprising:
        one or more noble metal compounds, a medium, a binder system, and one or more fluxes,
        wherein the binder system comprises a resin mixture of the following resins or reaction products thereof:
            a) 25 to 40 wt. % of one or more polyamide resins,
            b) 5 to 30 wt. % of one or more sulfurised recent resins,
            c) 20 to 55 wt. % of one or more rosin-modified resins,
            d) 0 to 30 wt. % of one or more alkylphenol resins and
            e) 0 to 30 wt. % of other resins.

2. A process for producing an article having a noble metal decoration, which comprises:
    indirectly printing the noble metal decoration on the article using the transfer according to claim 1, and
    firing the article.

3. An article produced by the process according to claim 2.

4. The transfer according to claim 1, wherein the binder system of the noble metal preparation contains at least two different rosin-modified resins in a ratio by weight of from 10:1 to 1:10.

5. The transfer according to claim 1, wherein the binder system of the noble metal preparation contains at least one rosin-modified resin and an alkylphenol resin in a ratio by weight of from 10:1 to 1:1.

6. The transfer according to claim 1, wherein the binder system of the noble metal preparation contains reaction products of two or more of the resins, and wherein the reaction products are formed at 50 to 150° C.

7. The transfer according to claim 1, wherein the binder system of the noble metal preparation contains reaction products of two or more of the resins, and wherein the reaction products are formed at 50 to 150° C. in the presence of the noble metal compounds and a sulfur-containing gelling agent.

8. The transfer according to claim 1, wherein the noble metal compounds and the resins or the reaction products thereof of the noble metal preparation are gelled by addition of 0.1 to 3 wt. %, with respect to the preparation, of a sulfur-containing gelling agent.

9. The transfer according to claim 1, wherein the noble metal preparation contains 10 to 40 wt. % of solvent with a boiling point above 110° C.

10. The transfer according to claim 9, wherein the solvent is at least one selected from the group consisting of aromatic and cycloaliphatic hydrocarbons, terpenes, ketones, alcohols and ethers.

11. The transfer according to claim 10, wherein the solvent is an alkylated aromatic compound.

12. The transfer according to claim 1, wherein the noble metal preparation contains 10 to 30 wt. % of waxes and less than 10 wt. % of organic solvents.

13. The transfer according to claim 12, wherein the waxes are selected from the group consisting of fatty alcohols, fatty amides, polyolefin waxes and polyalkylene glycols.

14. The transfer according to claim 1, wherein the sulfurised recent resin of the noble metal preparation is a sulfurised dammar resin and the rosin modified resin(s) is/are selected from the group consisting of glycerol esters of rosin, pentaerythritol esters of rosin and glycerol esters of maleic acid-modified rosin.

15. The transfer according to claim 1, wherein the noble metal of the noble metal preparation is selected from the group consisting of Au, Ag, Pd, Pt, and mixtures thereof.

16. The transfer according to claim 1, wherein the sulfurised recent resin of the noble metal preparation is a sulfurised dammar resin.

17. The transfer according to claim 1, wherein the binder system of the noble metal preparation consists of 27 to 55 wt. % of one or more rosin-modified resins, 7 to 20 wt. % of sulfurised dammar resin, 27 to 37 wt. % of polyamide resin and 0 to 30 wt. % of alkylphenol resin.

18. The transfer according to claim 17, wherein the binder system of the noble metal preparation contains two rosin-modified resins present in a ratio by weight of from 5:1 to 1:5 or a rosin-modified resin and an alkylphenol resin present in a ratio by weight of from 4:1 to 1:1.

19. The transfer according to claim 1, wherein the medium of the noble metal preparation containing one or more soluble organic noble metal compound(s) has been gelled at a temperature of 50 to 150° C. for 5 to 90 minutes, before or after addition of the flux(es), in the presence of 0.1 to 3 wt. %, with respect to the preparation, of one or more gelling agents selected from the group consisting of sulfenamides, dithioamides or another organic compound with a di-, tri- or tetrasulfide bridge.

20. The transfer according to claim 1, wherein the noble metal preparation contains substantially soluble gold compounds selected from the group consisting of resinates, sulforesinates, thiolates and dithiolates as the noble metal compounds.

21. The transfer according to claim 1, wherein the noble metal preparation is produced by mixing the noble metal compounds with a solvent-containing or solvent-free medium and the binder system at 50 to 150° C. in the presence of a sulfur-containing gelling agent before or after addition of the fluxes.

* * * * *